E. LINDMUELLER.
BLANK WELDING AND CHAIN FORMING MACHINE.
APPLICATION FILED MAR. 19, 1910.
1,097,245.
Patented May 19, 1914.
5 SHEETS—SHEET 1.
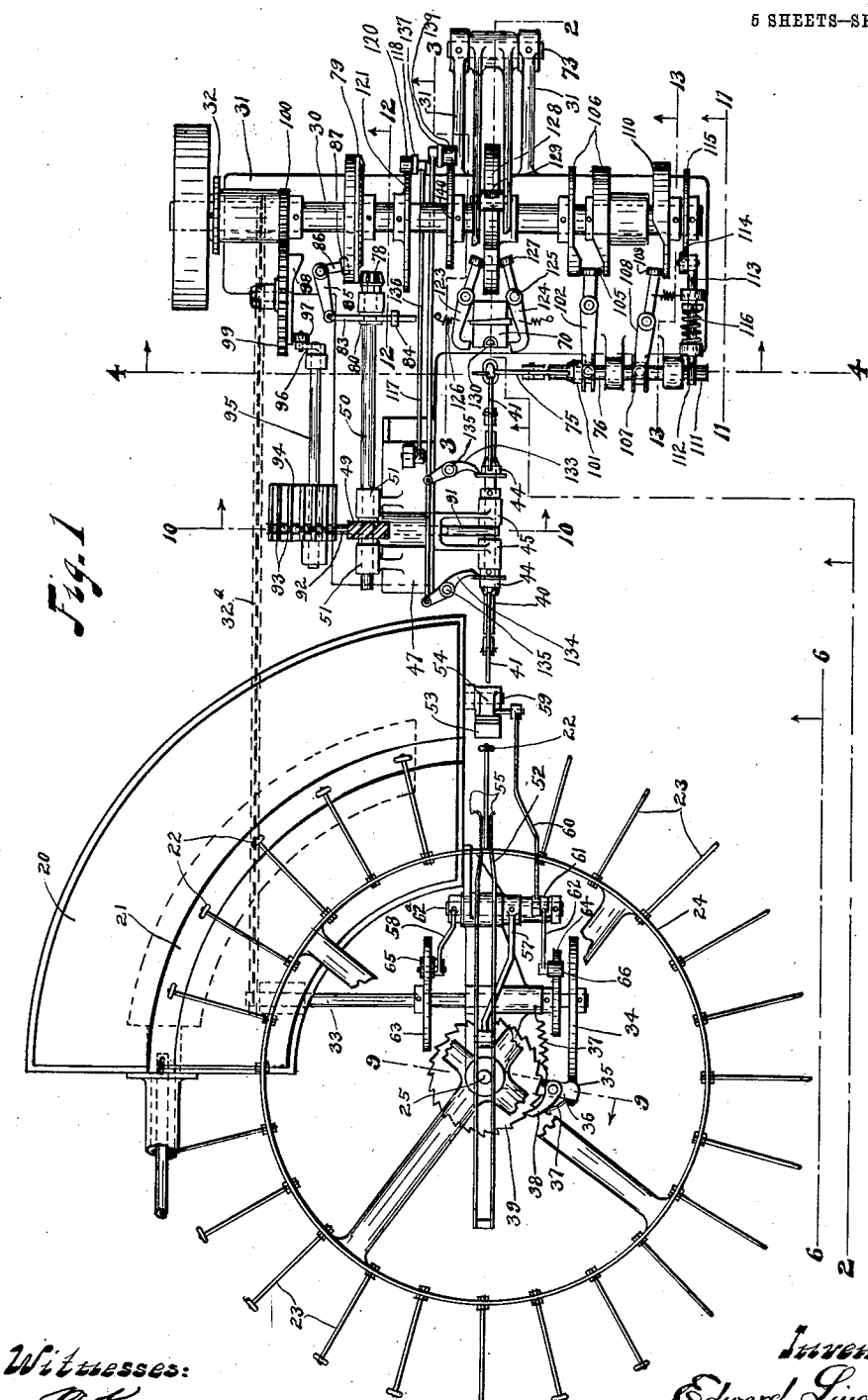

E. LINDMUELLER.
BLANK WELDING AND CHAIN FORMING MACHINE.
APPLICATION FILED MAR. 19, 1910.
1,097,245.
Patented May 19, 1914.
5 SHEETS—SHEET 2.
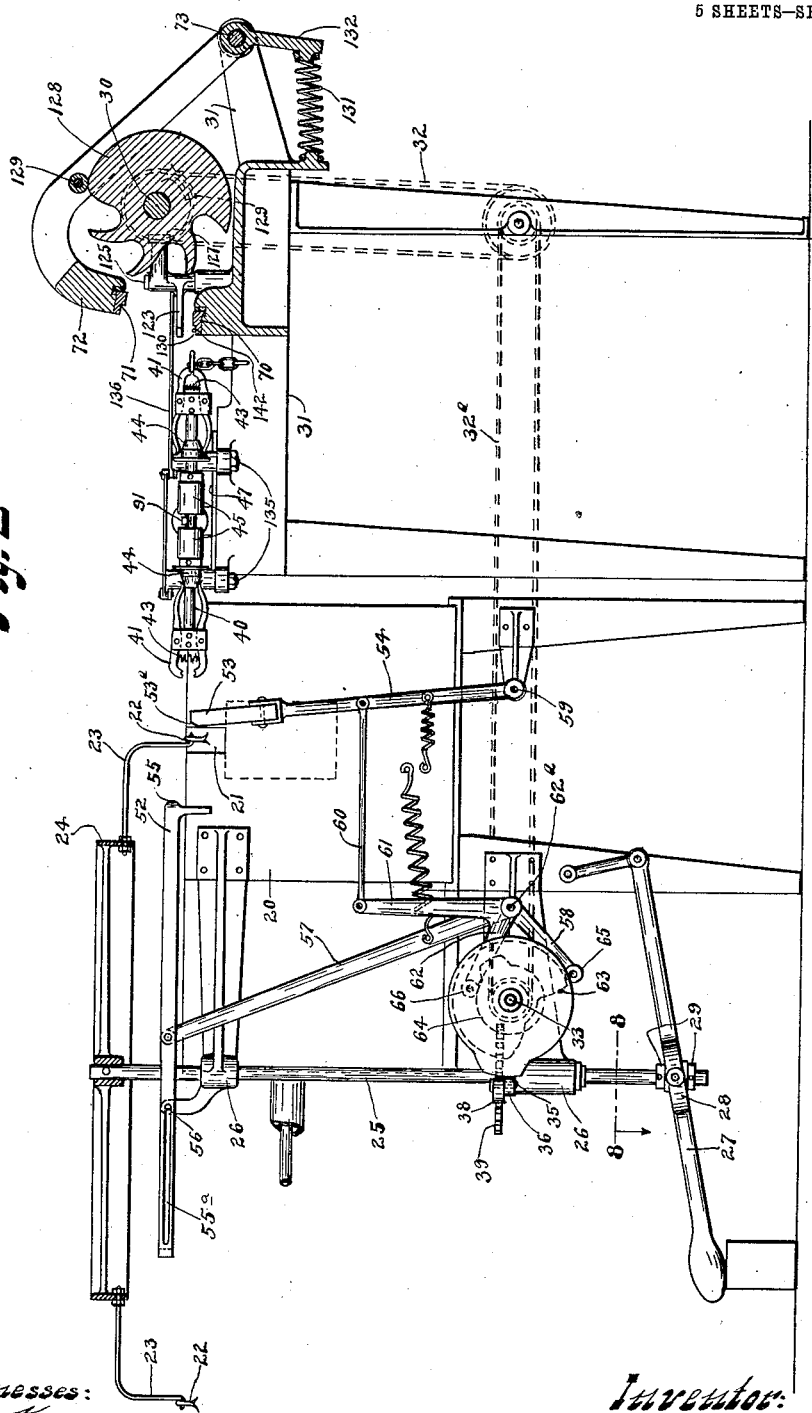
Witnesses:
J. P. Kemper
H. J. Kemper
Inventor:
Edward Lindmueller.
By Thurston & Kwis
His Attorneys.

E. LINDMUELLER.
BLANK WELDING AND CHAIN FORMING MACHINE.
APPLICATION FILED MAR. 19, 1910.
1,097,245.
Patented May 19, 1914.
5 SHEETS—SHEET 3.
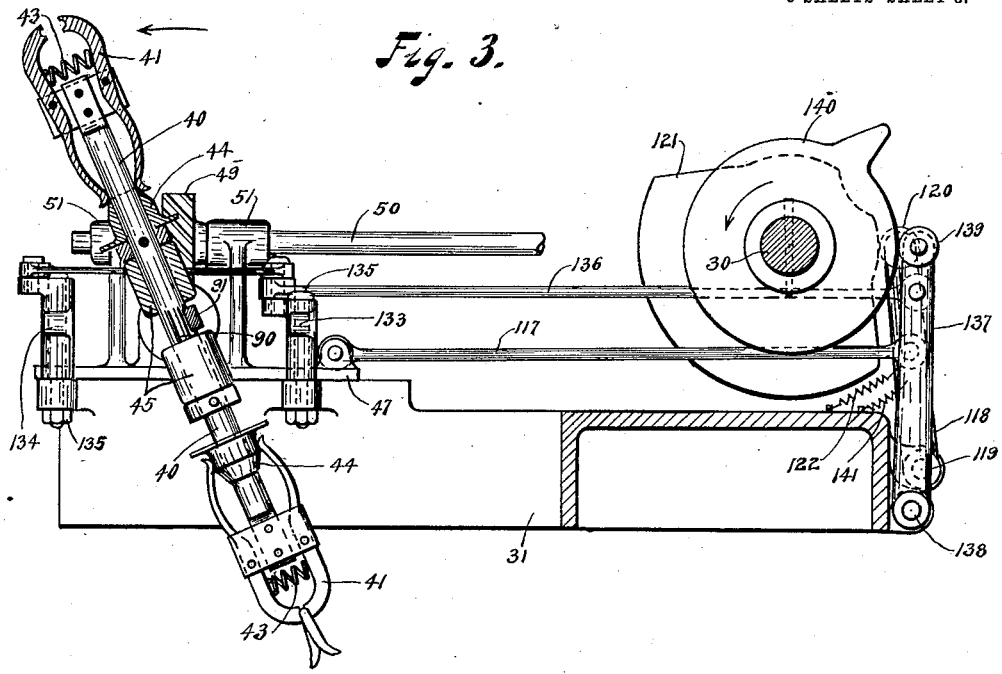
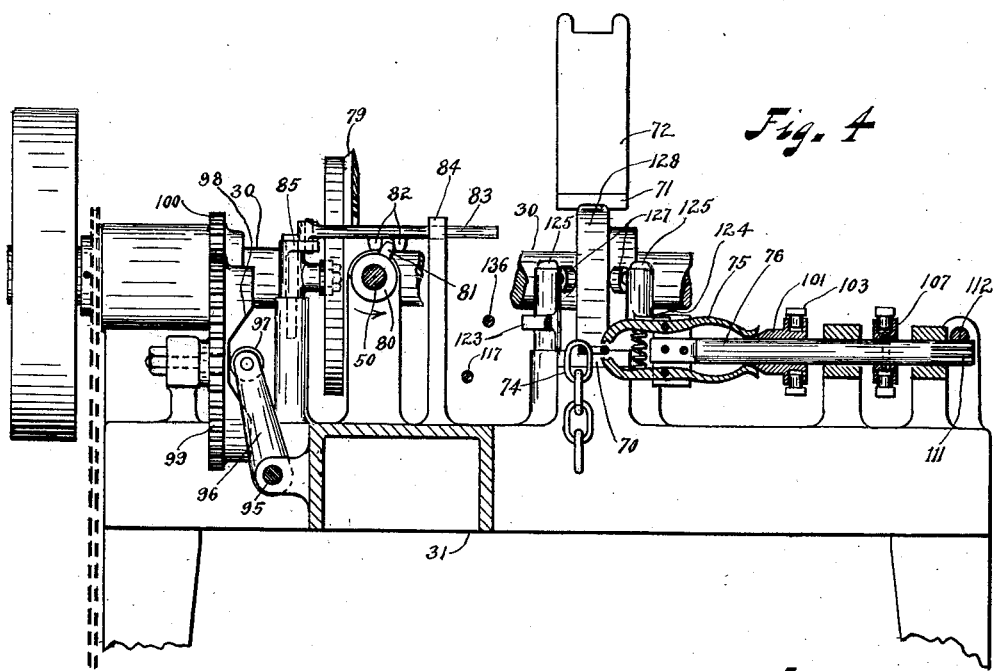

E. LINDMUELLER.
BLANK WELDING AND CHAIN FORMING MACHINE.
APPLICATION FILED MAR. 19, 1910.
1,097,245.
Patented May 19, 1914.
5 SHEETS—SHEET 4.
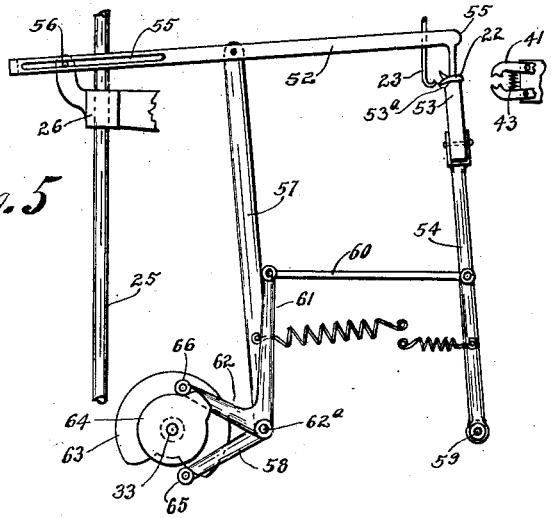
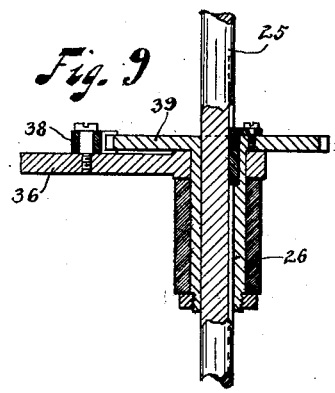
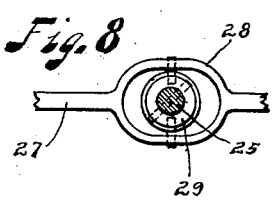
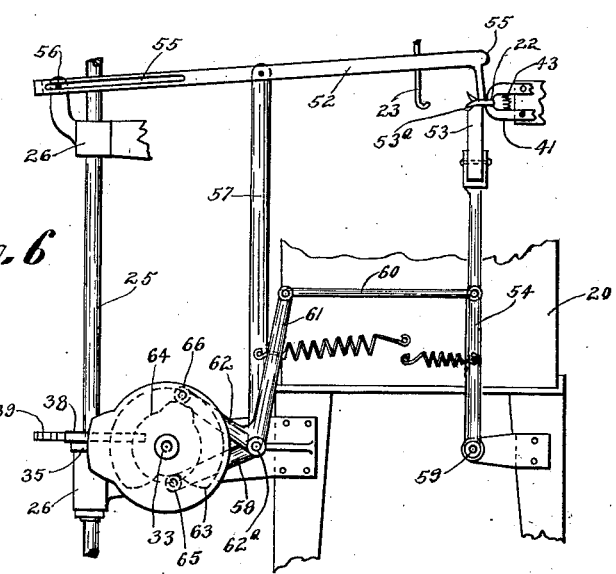
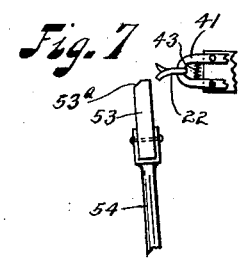

E. LINDMUELLER.
BLANK WELDING AND CHAIN FORMING MACHINE.
APPLICATION FILED MAR. 19, 1910.
1,097,245.
Patented May 19, 1914.
5 SHEETS—SHEET 5.
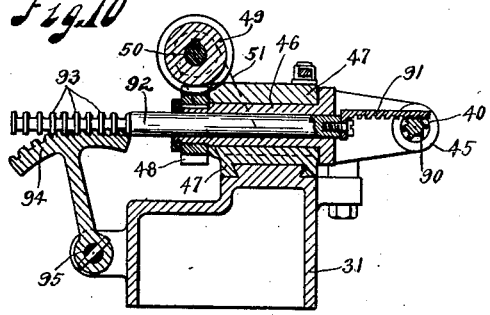
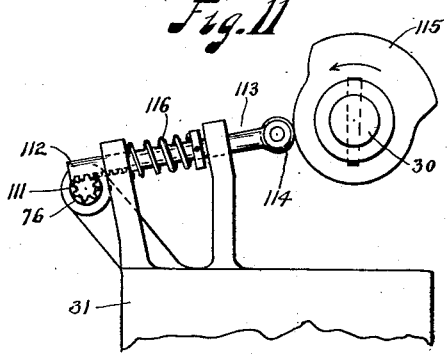
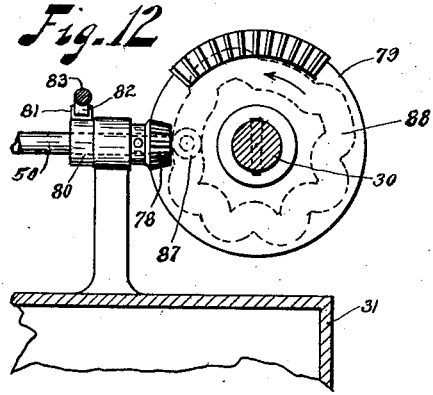
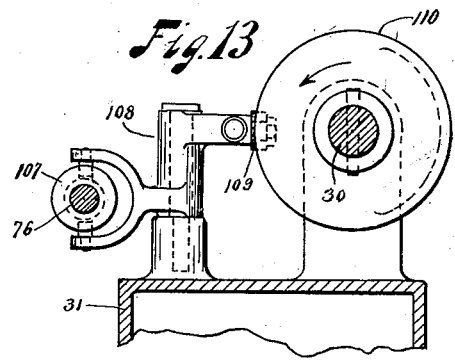
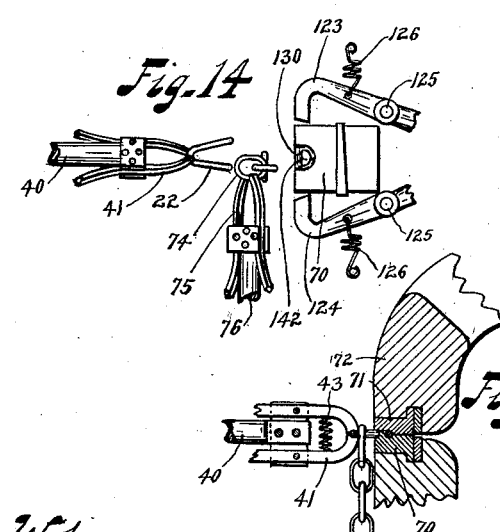
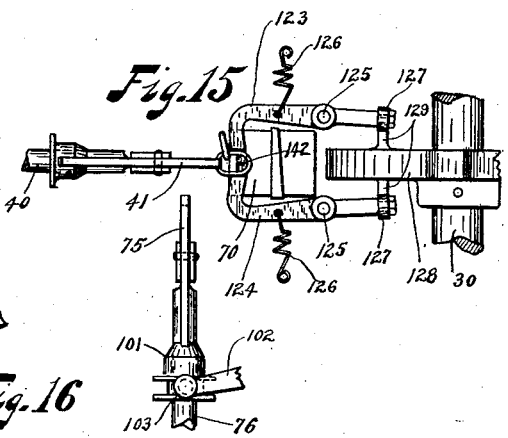
Witnesses:
Inventor:
Edward Lindmueller.
By Thurston & Kwis
His Attorneys.

UNITED STATES PATENT OFFICE.

EDWARD LINDMUELLER, OF CLEVELAND, OHIO, ASSIGNOR TO THE EDWARD MANUFACTURING COMPANY, OF CLEVELAND, OHIO, A CORPORATION OF OHIO.

BLANK-WELDING AND CHAIN-FORMING MACHINE.

1,097,245.  Specification of Letters Patent.  Patented May 19, 1914.

Application filed March 19, 1910. Serial No. 550,510.

*To all whom it may concern:*

Be it known that I, EDWARD LINDMUELLER, a citizen of the United States, residing at Cleveland, in the county of Cuyahoga and State of Ohio, have invented a certain new and useful Improvement in Blank-Welding and Chain-Forming Machines, of which the following is a full, clear, and exact description.

This invention relates to metal working machines and particularly to improvements in machines for welding or otherwise closing or operating on open ring or link blanks and for forming chains, especially welded chains.

The main object of the invention is to improve generally such machines so as to render their operation more satisfactory, and particularly to provide a machine wherein the operating parts are so arranged, constructed and operated that a machine of high efficiency is provided, and the complete cycle of operations of the machine and the different steps or operations through which the blank passes from the heating furnace until it is welded or otherwise operated upon and united to the chain, takes place in a small interval of time, and in fact, in a fraction of a minute, and wherein the complete cycle of operations can be repeated and carried on continuously without interruption.

The invention may be briefly summarized as consisting in certain novel details of construction, and combinations and arrangements of parts which will be described in the specification and set forth in the appended claims.

In the drawings, I have shown my invention applied to a machine including a furnace and an intermittently moving frame which carries the blanks through the furnace so as to present them successively to receiving or transferring mechanism which conveys the blanks one at a time to a rotating device which carries the blanks forwardly to or first in front of the dies of the welding means, where the blank is united to the last link of the chain and then passes between the dies where the blank is first engaged by laterally moving jaws which move the free ends of the blank together, and is then welded in the dies by being struck several successive blows on both sides, the blank being turned between the blows so that both sides are presented to the hammer; after being welded in this manner, the blank is removed from the dies and is, together with the other links of the partially formed chain, supported in position such that the next blank can be united thereto preparatory to being welded.

In the drawings which show the preferred embodiment of my invention, Figure 1 is a top plan view of the blank welding and chain making machine, certain portions being removed or broken away for the sake of clearness; Fig. 2 is a partial side elevation and partial longitudinal vertical sectional view, this section and elevation being taken along the irregular line 2—2 of Fig. 1, looking in the direction indicated by the arrows; Fig. 3 is an enlarged partial longitudinal vertical sectional view substantially along the irregular line 3—3 of Fig. 1, looking in the direction indicated by the arrow; Fig. 4 is a transverse vertical sectional view along the line 4—4 of Fig. 1, looking in the direction indicated by the arrows, the parts being shown on an enlarged scale; Fig. 5 is a detail or fragmentary view of a portion of the mechanism which transfers blanks from the intermittently moving frame to the jaws of the rotary device which carries the blanks to the dies, this view showing a blank in the process of being transferred from an arm of the frame to one set of jaws of the rotary carrying device; Fig. 6 is a somewhat similar view showing the positions of the parts just after the blank has been received in the jaws and gripped thereby, these parts being viewed from the position or plane corresponding to the line 6—6 of Fig. 1; Fig. 7 shows a blank gripped by the jaws, and shows also the so-called platform or carrying member which assists in transferring the blank from the arm of the frame to the jaws, in the act of swinging or retreating from the jaws so that the rotary member carrying the blank may be turned in a vertical plane end for end or through an arc of substantially 180° so as to present the blank to or in front of the dies; Fig. 8 is a horizontal sectional view substantially along the line 8—8 of Fig. 2, looking in the direction indicated by the arrow; Fig. 9 is a slightly enlarged vertical sectional view substantially along the line 9—9 of Fig. 1, looking in the direction indicated by the arrow; Fig. 10 is a transverse sectional view substantially along the line 10—10 of Fig. 1, looking in the direction indicated by the arrows, the parts in this and in the succeeding figures to be referred to, being shown on a slightly enlarged scale; Fig. 11 is a side elevation of a portion of the machine looking from a position corresponding to the line 11—11 of Fig. 1, and in the direction indicated by the arrow; Fig. 12 is a partial longitudinal sectional view substantially along the line 12—12 of Fig. 1, looking in the direction indicated by the arrow; Fig. 13 is a partial longitudinal sectional view substantially along the line 13—13, looking in the direction indicated by the arrow; Fig. 14 is a plan view showing certain portions of the operating mechanism and showing a blank in the act of being interlinked or united with the last complete link of the partially formed chain; Fig. 15 is a similar view showing the relative positions of these parts when the free or separated ends of the blank are squeezed or pressed together by laterally moving jaws; and Fig. 16 is a partial section and partial elevation of the dies and certain other portions and showing the blank being welded by the dies.

Referring now to the figures of the drawing, 20 represents a suitable heating furnace having at the top an arc-shaped slot 21 along which the blanks are carried so as to be heated to a suitable temperature before they are operated on in the machine. The blanks, which are shown at 22, are supported while being carried through the furnace upon the hook-like ends of arms 23, which are equally spaced about and are secured to the rim of a carrying frame or member 24, which I shall call the blank feeding member and which is designed to be turned intermittently in a horizontal plane. The blanks are in this case open link blanks having free or separated ends adapted to be closed and in this case welded together, and these blanks are supported on the frame in vertical position with the open ends downward. This carrying or feeding member 24 is secured to a vertical spindle 25 which is mounted in suitable bearings, one of which is shown at 26, and is designed to be raised or lowered so that the blanks can be lifted from or lowered into the slot 21 of the furnace, by means of a pivoted lever 27 having a yoke portion 28, (see Figs. 2 and 8) which loosely engages a grooved collar 29 secured to the spindle. This rotary blank feeding member 24 and all other parts of the machine are actuated from the horizontal spindle 30 which is mounted upon the frame or bed 31. In this case, the rotary movement of the spindle 30 is transmitted by means of suitable sprocket chains 32 and 32ᵃ to a horizontal shaft 33 which is supported below the rotary blank carrying member 24. Other well known forms of driving means may be employed than the sprocket chains. To turn the rotary member 24 intermittently, I have provided on the spindle 33 a suitably formed cam 34 which is engaged by a roller or curved part 35 carried by a lever 36 which is held yieldingly toward the spindle 33 so that the part 35 is pressed against the cam by a spring 37. This lever is provided with a pawl 38 which is held in engagement and coöperates with a ratchet 39 secured to the spindle 25. The teeth of this ratchet are of a number such, and are so spaced that, at each revolution of the spindle 33 and cam 34, this rotary blank feeding member 24 is shifted an angular distance equal to the angular spacing of the arms 23 upon which the blanks are suspended and so that as the blank carrying member is intermittently shifted, a heated blank is at each movement brought into line with the transferring and carrying mechanism to be referred to presently. The blanks are carried to the dies by a spindle 40 which rotates in a vertical plane and is also given certain other movements to be referred to presently. This spindle 40 is provided at its ends with two sets of jaws 41—41, and is adapted to be shifted through an arc of substantially 180° so as to present one blank carried by one set of jaws before or to a point adjacent the dies, and so as to bring the other set of jaws substantially to a position to receive another blank to be subsequently operated upon. Both sets of jaws have outwardly projecting portions which are normally spread apart or held in open position by springs 43 and also have inwardly projecting portions adapted to be spread apart by movable collets 44 which are mounted on the spindle so as to cause the forwardly extending portions to grip the blanks. The spindle is supported in a pair of bearings 45 which are carried by a tubular shaft 46 (see Fig. 10) which is rotatably mounted in a slide 47 which engages suitable guides on the frame 31 so that it may slide along the same horizontally toward or away from the main driving spindle 30. At the rear end of the tubular shaft 46 which carries the spindle 40 is a gear 48 which is engaged and driven by a gear 49 provided in this case with spiral teeth as shown most clearly in Fig. 1, and mounted upon a spindle 50 supported in suitable bearings 51 on the frame 31.

When a blank is about to be delivered to one of the set of jaws 41, the spindle is in the position shown in Figs. 1 and 2, that is, it is substantially horizontal and is directly in line with one of the blanks 22, and with the corresponding arm 23 upon which the blank is suspended. To transfer a blank from the arm 23 to the jaws of the carrying spindle 40, I employ a plunger or so-called ram 52, which is adapted to be shifted in substantially endwise direction, and a carrier or so-called platform 53 carried by a pivoted arm 54, these two members coöperating in a manner such that the ram 52, which is bifurcated, as shown, and has at its forward end slightly diverging lips 55, moves forwardly and straddles the arm 23 upon which the blank is suspended, forcing the blank onto the pivoted carrier 53 and holding it thereon while the carrier is swung forwardly so as to deliver the blank to the jaws which are then closed by shifting the proper collet 44. It may be here stated that the two collets 44 which operate the two sets of jaws are shifted simultaneously by mechanism to be referred to presently, and while one collet causes the rear pair of jaws to grip a blank to be operated upon, the other collet opens the forward pair of jaws so as to release the link which has already been welded and added to the partially completed chain. It will be noted that the platform 53 has a beveled portion 53ª; this is provided in order that the blank when transferred by the ram or plunger 52 to the platform 53, will be turned from a vertical position to a horizontal, in order that it may be readily grasped by the jaws 41. If necessary, the blank may be moved positively into the jaws 41, by a slight movement of the ram 52.

The plunger 52 which coöperates with the carrier 53 to transfer the blank from the arm of the frame to the jaws has an elongated slot 55ª which is engaged by a pin 56 which serves as a combined support and guide for the plunger, and this plunger has also connected thereto an arm 57 forming part of a bell crank lever, the other arm of which is shown at 58. The arm 54 which is provided at its upper end with the carrier 53 is pivoted at 59 on a suitable stationary part of the machine, and this arm 54 is connected by a link 60 to the upper end of an arm 61 forming part of a bell crank lever, the opposite arm of which is shown at 62, this bell crank lever which is connected to the arm 54, being mounted on a common support 62ª with the bell crank lever to which the plunger 52 is connected. The plunger 52 and the carrier 53 are actuated in a manner such that the plunger 52 first moves forwardly and slides the blank off the hook and turns the blank over upon the carrier 53, so that the plunger and carrier may then move forwardly and deliver the blank to the rear set of jaws 41, and this is accomplished by two properly formed cams 63 and 64, which are mounted on the spindle 33, and the former of which is engaged by a roller 65 carried by the arm 58 of the bell crank which operates the plunger 52, and the latter of which is engaged by a roller 66 carried by the arm of the bell crank which operates the carrier 53. It may be here stated that this mechanism for transferring the blanks to the jaws 41 is employed particularly for turning the blanks from vertical to horizontal position, and also for removing the jaws 41 from the heat of the furnace 21.

After the rear set of jaws 41 grasps the blank and the forward set of jaws releases the blank which, after being operated on becomes the last link of the chain, the spindle is quickly turned end for end or rotated in a direction indicated in Fig. 3, through an arc of substantially 180° so as to carry the blank by rotary movement of the jaws which swing downwardly and thence upwardly to a position in front of and slightly above the fixed or stationary die 70, which coöperates with the movable die 71 carried by a hammer 72 which is pivoted at 73 on the frame 31, the pivotal axis of the arm 72 being, as will be noted from Fig. 2, below the stationary die 70. As the spindle swings so as to bring the blank to a position before the dies, the blank is caused to engage in the last completed link which is designated 74 in Fig. 14, and which together with the other links of the partially formed chain, are held in position in front of the approaching blank by means of what may be termed chain holding jaws 75 which are similar to the jaws 41 carried by the rotary spindle 40, and are carried by a spindle 76 arranged at right angles to the plane of movement of the rotary carrying spindle 40. The spindle 76 and jaws are adapted to be given endwise movements and also to be turned or rotated at the proper times in a manner to be referred to presently. Although the action or movements of the chain holding jaws will be explained more fully later, it may be here stated that these jaws 75 move forwardly and grip the last link formed, and hold this link and the partially formed chain in a position such that one of the ends of the approaching open blank may enter into the closed or completed link, the entrance of the end of the blank into the closed link being accomplished by reason of the fact that the chain holding jaws 75 and link are shifted endwise slightly from a position of the link directly in line with the dies, into a position so that the link is in the path of the end of the blank which is approaching, and are also turned from the position shown in Fig. 1, through a suitable arc so that the blank leans toward the rear end of the machine at an angle of about 45° to the horizontal. The entrance of the end of the blank into the link is rendered more certain by reason of the fact that the spindle 40 in its rotary movement in a vertical plane, as explained, is skewed or turned slightly on its longitudinal axis in a manner and by mechanism to be referred to presently, so that the end of the blank is approximately in line with the center of the completed link and so that both the link and the blank are in the best possible positions for the end of the rising or approaching blank to enter the link.

The spindle 40 which carries the blank holding jaws is rotated in the vertical plane so as to carry the blank to a position in front of the dies, as described, and is also given additional movements in a vertical plane to be referred to presently, by turning at the proper times and the proper amounts, the spindle 50 to which is secured the gear 49 which meshes with the gear 48, (Fig. 10). These additional movements referred to are utilized for raising and then lowering the blank onto the stationary die and for raising the blank so that it may be turned after each of a number of blows given by the hammer 72. The spindle 50 is actuated so as to turn the spindle 40 in a vertical plane through the angle of substantially 180° as described, by means of a bevel gear or pinion 78 and a combined mutilated bevel gear and cam member 79 which is mounted upon the main spindle 30. This member 79, as shown clearly in Fig. 12, has at one side a toothed segment or section which at each revolution of the gear 79 is caused to engage the bevel pinion 78 so as to rotate the spindle 50 and thereby swing the spindle 40 through the proper angle so as to bring the blank to the position referred to.

The additional rotary movements of the spindle 40 in a vertical plane, aside from that which turns the spindle end for end so as to bring a new blank before the dies, is accomplished independently of the gears 78 and 79 and after the toothed portion of the cam and gear member 79 has passed beyond and is out of engagement with the pinion 78, and this is accomplished by the following mechanism: By referring to the transverse sectional view of Fig. 4, it will be seen that the spindle 50 is provided adjacent and just at the rear of the bevel pinion 78 with a gear 80 having a single tooth 81 which coöperates with two teeth 82 on the lower side of a longitudinally movable rack arm 83 which passes through an opening in a guide 84 and is connected to an arm 85 of a pivoted bell crank, the other arm 86 of which is provided at its free end with a roller 87 (see Figs. 1 and 12) which engages within a suitably formed cam groove 88 provided in the opposite side of the combined gear and cam member 79. This cam and the other parts are so formed that after the spindle 50 has been rotated by the engagement of the teeth of the member 79 with the bevel pinion 78, and after these teeth have moved beyond the pinion, then the arm 83 having the two teeth 82 is adapted to be actuated by the bell crank by reason of the cam groove 88, in a manner such that the spindle 50 is turned back and forth at the proper times, and consequently the spindle 40, is shifted further amounts so as to raise and lower the forward jaws and blank in a vertical plane, it being understood that the parts are so proportioned and timed that after the toothed segment on the member 79 passes beyond the pinion 78, the single tooth 81 on the gear 80 is between or in position to be engaged and shifted by the two teeth 82 on the arm 83.

It was previously stated that when the spindle is being turned in a vertical plane so as to bring the blank to a position in front of the dies, the spindle 40 is turned slightly on its longitudinal axis so as to skew the blank and cause one of the free ends thereof to enter into the last formed link. This turning of the spindle on its longitudinal axis 40 at this time, and the other turning movements of the spindle about its longitudinal axis, to be referred to later, are accomplished by the following mechanism.

By referring particularly to Figs. 3 and 10, it will be seen that the spindle 40 is provided between its bearings 45 with a toothed portion 90 which is engaged by a rack 91 carried by a longitudinally movable and also rotary member 92 which projects through and has a bearing in the tubular spindle 46 which supports the spindle 40. This member 92 is provided at its rear end with a series of annular teeth 93 in the nature of annular rack teeth, and these teeth are engaged by a segment gear 94 carried by a horizontal rock arm or spindle 95 which is at right angles to the main driving spindle 30. The spindle 95 is provided at its forward end with an arm 96 having at its free end a roller 97 which engages the face of a cam 98 secured to the side of a gear 99 which meshes with a smaller gear 100 carried by the shaft 30. The cam 98 is so formed that at the proper times, the spindle 95 will be actuated so as to rock the gear segment 94 and cause an endwise movement of the member 92 and thereby turn the blank carrying spindle 40 on its longitudinal axis and in one direction or the other. It may be noted at this point that the teeth 93 on the member 92 and teeth on the segment 94 are so formed that the member 92 may be turned on its axis relative to the segment 94, and may also be shifted laterally toward and away from the main driving spindle 30 relative to the segment 94. These lateral movements and the purposes thereof will be referred to presently.

After the end of the blank has been inserted in the last formed link, which is supported on the chain holding jaws 75 carried by the spindle 76 referred to, the spindle is turned on its longitudinal axis back to its normal position with the blank substantially horizontal. The jaws 75 are then caused to open so as to release the link which together with the other links forming the partially formed chain are now supported by the blank and by the blank holding jaws 41, and the jaws 75 and spindle 76 are then shifted in an endwise direction or away from the link so as to clear the same to permit the blank to be moved forwardly between the dies. The opening and closing of the jaws 75 and the endwise movement of the jaws 75 together with the spindle 76, and also the rotary movement of the spindle 76 and jaws 75 given for the purpose of turning the last completed link so that it may be interlinked with the approaching blank in the manner previously described, are accomplished in the following manner and by the mechanism now to be described.

The opening and closing of the chain holding jaws 75 is brought about by a sliding collet 101 which is adapted to be shifted back and forth so as to open and close the jaws by a pivoted lever 102 which at its rear end is provided with a yoke 103 which loosely engages the collet and at its forward end is provided with a roller 105 which engages a suitably formed cam 106 mounted on the spindle 30. In order that the spindle 76 and jaws 75 may be shifted endwise so that the jaws may be moved to a position to grasp a link or may be moved in the opposite direction away from the link, a grooved collar 107 is secured to the spindle and this collar is engaged by a yoke provided at one end of a lever 108 which at its forward end is provided with a roller 109 which engages a suitably formed cam 110 mounted on the spindle 30. In order that the spindle may be turned on its longitudinal axis so as to present the link in proper position to be engaged by the approaching blank, and may afterward be restored to its normal position, the outer end of the spindle is provided with a toothed portion 111 which is engaged by a rack 112, (see Fig. 11), carried by a plunger or longitudinally movable arm 113 having at its forward end a roller 114 which engages a cam 115, the roller being held in engagement with the face of the cam by a coil spring 116. The sequence of steps or movements of this mechanism just described will be referred to more fully later, but at the present time it will be sufficient to state that when the blank is interlinked with the last formed link which at that time is supported by the jaws 75 in front of the dies and slightly below the face of the lower die 70, the jaws 75 release the link by the action of the cam 106, lever 102, and collet 101, and are then moved in an endwise direction by reason of the cam 110, lever 108, and collar 107 which the lever engages. The blank is now ready to be moved forward between the dies. Before it moves between the dies, however, the spindle 40 is turned slightly on its longitudinal axis the same amount but in the opposite direction to that in which it was turned when skewing the blank to cause it to properly interlink with the last formed link, so that the blank after said return movement, is again substantially horizontal. Next the blank is raised slightly with reference to the dies so that it will clear the lower die in moving forwardly, and this raising of the blank is caused by the turning of the spindle 40 on its transverse axis by a movement of the rack arm 83 to the left, as viewed in Fig. 4, it being understood that after the segment gear of the member 79 has passed beyond the pinion 78, and after the spindle 40 was turned end for end, the tooth 81 of gear 80 was left between the teeth of the rack arm 83. Next the blank, together with the spindle 40 and parts supporting the same, are moved forwardly so that the blank is presented between the dies, but slightly above the lower die. This is accomplished by moving forwardly the slide 47 which as stated before, is mounted to slide toward and away from the spindle 30. The specific mechanism for accomplishing this includes an arm or rod 117 which is loosely connected at its rear end to the slide and at its forward end is connected (see Fig. 3) to an arm 118, which is pivoted at 119 on the end of the frame 31 and this arm 118 is provided at its upper end with a roller 120 which engages the face of a suitably formed cam 121 mounted upon the spindle 30, the roller being held in engagement with the cam by a coil spring 122 which is connected to the frame and to the arm 118. This cam 121 is so formed that at the proper instant it moves the slide forwardly a sufficient amount to bring the blank between the dies, but as stated before, slightly above the lower die 70, so that it lies between laterally movable compressing jaws or squeezers 123 and 124 which are supported from the frame, above the lower or stationary die.

After the blank is moved forwardly, as stated, and before it is welded, the free ends of the open blank are squeezed together by these laterally movable compressing jaws 123 and 124 which are formed on the ends of levers pivotally supported from the frame or pins 125, and have their forward ends normally held apart by coil springs 126. At the rear ends of these compressing levers are rollers 127 which are adapted to be spread apart so as to cause the jaws to be shifted toward each other and the free ends of the blank to be moved inwardly and to overlap each other, by means of a cam 128 which is mounted on the spindle 30. This cam, which is utilized also for operating the hammer, as will be explained, has on opposite sides, as shown most clearly in Fig. 15, lugs 129 which spread the rollers so as to cause the ends of the blank to be compressed or brought together. As soon as the ends of the blank are brought together, as stated, the jaws are again spread by the springs 126, and the blank is now ready to be welded.

The blank is next lowered onto the stationary die so that it lies within the recess 130 of the die 70 by turning the spindle 40 in the vertical plane or about its transverse axis so as to lower the forward end thereof, it being understood that the blank is still gripped by the jaws 41. This lowering of the blank is brought about by the actuation of the arm 83 toward the right, as viewed in Fig. 4, by the cam member 79 and by the engagement of the teeth 82 of this arm with the single tooth 81, of the gear 80 carried by the spindle 50, the spindle 50 being merely rocked at this time in the proper direction an amount sufficient to lower the blank onto the stationary die. The blank is then effectively and securely welded by being given several successive blows by the hammer 72 which is brought down forcibly onto the blank by gravity and also by the action of a spring 131, acting between the frame and an arm 132 connected to this hammer. The hammer is raised and permitted to drop by the cam 128 previously referred to, this cam having on its periphery a series of abrupt recesses and projections which are engaged by a roller 129 carried by the arm 72. In order, however, that the blank may be properly welded, it is caused to be turned so that the successive blows are struck on opposite sides of the blank. This turning of the blank is accomplished by first turning the spindle 40 in the vertical plane so as to raise the blank from or free of the die 70, this being accomplished by the cam actuated arm 83 and by the teeth 82 engaging the tooth 81 and turning the gear 80 and spindle 50 in the proper direction, and then when the blank is raised from the die, by turning the spindle 40 on its longitudinal axis through an arc of 180° by shifting in the proper direction and proper amount the rack 91 which engages the toothed portion 90 of the spindle 40, this rack being actuated so as to turn the spindle 40 and blank by the segment 94 which is operated by the cam 98. As soon as the blank is turned, it is lowered onto the die and again struck by the hammer, and is then again raised, turned, lowered and again struck, and this operation is repeated several times, but in this case four times. After the last blow of the hammer, the newly formed link is raised from the die by turning the spindle 40 in the vertical plane in the manner above stated, and is then moved outwardly from between the jaws 123 and 124 by shifting rearwardly the slide 47 and parts carried thereby, including the spindle 40 and jaws 41. Next, the spindle 40 is again turned slightly on its transverse axis so as to bring the newly formed link in line with the chain holding jaws 75, which are next moved forwardly, as previously explained, by the cam 110, and lever 108 which shifts the spindle and jaws, and are then caused to grip the link by the action of the cam 106 and lever 102 which shifts the collet 101 forwardly.

While the blank was being operated on or welded, as explained, the jaws 41 at the rear end of the spindle 40, were, for the time being, idle, although open preparatory to receiving a new blank. As soon, however, as a newly formed link still supported by the jaws 41 at the forward end of the spindle is gripped by the chain holding jaws 75, as shown in Fig. 1, the forward pair of jaws 41 are caused to release said newly formed link, and simultaneously a new blank is caused to be gripped by the jaws at the rear end of the spindle 40, the blank feeding and delivering mechanism being so timed that the blank is transferred to the jaws at the rear end of the spindle 40 just before the jaws at the forward end of the spindle release the newly formed link. The simultaneous opening of the forward pair of jaws 41 and the closing of the rear pair of jaws are accomplished by the movement of two fingers 133 and 134, which are pivotally supported from the frame on vertical pins 135 and which simultaneously shift the two collets 44 rearwardly, one to cause the opening of the jaws at the forward end of the spindle, and the other to cause the closing of the jaws at the rear end of the spindle. These fingers are simultaneously shifted by a rod 136, to which the fingers are connected and which is pivotally connected at its forward end to an arm 137 pivoted at 138, on the frame of the machine, and provided at its upper end with a roller 139 which engages the periphery of a cam 140 mounted upon the spindle 30, and which is held in engagement with the face of the cam by means of a coil spring 141. As soon as the forward jaws 41 have released the newly formed link, and the rear jaws 41 have received a blank, the spindle 40 is again turned end for end by the engagement of the toothed portion of the rotary member 79 with the pinion 78, so that the jaws which have been at the rear of the spindle during the operations described, and which have just received a new blank, are swung forwardly through an arc of substantially 180°, and the new blank, which is now carried by these jaws, just prior to the termination of the upward movement is skewed slightly and is caused to interlink with the last formed link, the latter having meanwhile been turned from the position shown in Fig. 1, by turning the spindle 76 so that it leans rearwardly beyond the perpendicular and having been moved slightly to one side of the center line of the dies by a slight endwise movement of the spindle 76, caused by the cam 110, so as to be in proper position to permit one end of the blank to enter the link. As soon as the blank is connected to the link, the spindle is again turned from the skewed position so that the blank is substantially horizontal, after which the cycle of operations previously described is repeated.

Just before the spindle 40 is swung end for end and after the forward pair of jaws have released the link, the spindle is given a slight endwise movement from the position shown in Fig. 1, so that the forward pair of jaws will clear the link now supported by the chain holding jaws 75. As soon as the jaws clear or swing above the link, the spindle may again be moved endwise to its normal position. These slight endwise movements are brought about by the particular shape of the cam 121 which controls the slide 47.

The various operations carried on in sequence and part carried on simultaneously in different parts of the machine is completed in a very short space of time, and in fact so rapidly that several blanks can be welded and united to the chain in a minute.

The operation of the machine can be carried on not only with great rapidity but continuously without danger of interruption and this is due largely to the fact that practically all of the parts of the machine are operated positively and not by the action of springs or other unreliable means, although the parts may be returned to normal position by springs.

As before stated, the hammer 72 is pivoted below the stationary die. This is an important feature, inasmuch as the blow of the hammer when it is delivered to a blank forces the metal of the blank against the curved lip or projection 142 of the stationary die 70, this lip being shown very clearly in Fig. 14. Thus, the overlapping ends of the blank are effectively welded both on the inner side of the blank or link, and at the outer side, leaving no open seam in any part.

The means for actuating the spindle 50 independently of the gears 78 and 79 so as to rock the blank carrying spindle 40 in a vertical plane back and forth at the proper times to permit the blank to be raised and lowered in order that it may be properly welded on both sides and otherwise lifted from or lowered into the die 70, is a very important feature for the reason that not only can the spindle 50 be shifted forwardly and backwardly while the combined gear and cam member 79 is rotated continuously in one direction, but the cam groove 78 on this member 79 is so formed that just before the gear segment on the rotating member 79, which must of necessity, be rotated at considerable speed, strikes the bevel pinion 78, the spindle 50 and pinion 78 are started in rotation in a direction that they are rotated by the gear segment of the member 79, so that the gear segment engages the pinion 78 and drives it without any serious blow being delivered to the teeth of the two members 78 and 79, and without any considerable jerk. This preliminary or starting movement of the pinion 78, is, as will be understood, given by the action of the two teeth 82 on the cam operated arm 83, these teeth being at the proper moment shifted toward the left, as shown in Fig. 4, so that the tooth 81 and gear 80 carrying this tooth are rotated or started in rotation in a direction indicated by the arrow. Thus, there is no danger of the teeth on the pinion 78 or member 79 being stripped, although the member 79 may be driven at a rather high speed. It will be understood, that when the segment gear on the member 79 engages and starts to rotate the pinion 78, the rack arm 83 is again moved to the right as viewed in Fig. 4, or substantially to the position shown in this figure, so that the teeth 82 will be in position to receive between them the single tooth 81 of gear when the spindle 40 is turned end for end or when the segment gear or member 79 passes beyond the bevel pinion 80. Thus, the rack teeth 82 and gear tooth 81 will be in such position that the blank carried by the forward pair of jaws may be raised and lowered with respect to the dies.

It is deemed unnecessary to explain in detail the shape and configuration of the different cams, which are employed in the machine, as it will be readily understood that these cams can be without difficulty so designed or shaped and so timed that the members actuated by the cams will be shifted at the proper times and the proper amounts to bring about the movements and sequence of operation desired.

It will be understood that the machine may be utilized for uniting into a chain links of a shape other than here shown, such, for example,—as circular links or rings. Also many features of my invention may be employed in a machine for welding or otherwise closing blanks such as ring blanks without attaching them into a chain, and when the blanks are formed into a chain, it is not essential that the blanks be welded, but other blanks operating or closing means may be employed. In the claims, I intend the expression "blank closing means" or "blank operating means" to include other than dies for welding the blanks.

I do not desire to be confined to the exact details shown, but aim in my claims to cover all modifications which do not involve a departure from the spirit and scope of my invention.

Having thus described my invention, what I claim and desire to secure by Letters Patent is:—

1. In a machine for operating on open blanks, a movable blank feeding member, blank closing means, mechanism for carrying the blanks forwardly to the closing means, and mechanism for transferring the blanks from the feeding member to said carrying mechanism, said transferring mechanism comprising a movable platform which receives the blanks from the feeding member and carries them forwardly to said carrying mechanism and means for disengaging the blanks from the feeding member.

2. In a machine for making chain links, rings and the like from open blanks, a movable blank feeding member, blank closing means, mechanism for carrying the blanks forwardly to the closing means, and mechanism for transferring the blanks from the feeding member to said carrying mechanism, said transferring mechanism including a pivoted platform which receives the blanks from the feeding member and swings forwardly so as to bring them to the carrying mechanism and means for causing delivery of the blanks from the feeding member to the platform.

3. In a machine for operating on open blanks, a movable blank feeding member, blank closing means, mechanism for carrying the blanks forwardly to the closing means, mechanism for transferring the blanks from the feeding member to said carrying mechanism, said transferring mechanism including a member which moves between the feeding member and the carrying mechanism, and a device for shifting the blanks from the feeding member to said movable device of the transferring mechanism.

4. In a machine for operating on open blanks, a movable blank feeding member, blank closing means, mechanism for carrying the blanks forwardly to the closing means, mechanism for transferring the blanks from the feeding member to said carrying mechanism, said transferring mechanism comprising a platform which moves between the feeding mechanism and the carrying mechanism, and an endwise movable ram which shifts the blanks from the feeding member to said platform and turns them to a position to be received by the carrying mechanism.

5. In a machine for operating on blanks, blank feeding means, blank operating means, and mechanism for carrying blanks from said feeding means to said operating means, said mechanism including a movable device having blank gripping means, means for swinging said device in a vertical plane about a transverse axis so as to carry a blank from the feeding means toward the operating means, and means for turning said device prior to the termination of the swinging movement about its longitudinal axis.

6. In a machine for closing or operating on open blanks, blank feeding mechanism, blank closing means, mechanism for carrying the blanks from the feeding mechanism to the closing means, said carrying mechanism comprising a device which moves in a vertical plane about a transverse axis and is provided at both ends with blank gripping means which are adapted to alternately carry blanks to the closing means.

7. In a machine for closing or operating on open blanks, blank closing means, mechanism for carrying blanks forwardly to the closing means comprising a device which moves in a vertical plane about a transverse axis so as to carry a blank to a point adjacent the closing means, and means for then giving said device an endwise movement so as to carry the blanks into the blank closing means.

8. In a blank working or operating machine, means adapted to operate on the blanks, mechanism for carrying the blanks to said means, comprising a device having blank holding means, means for turning the said device in a vertical plane about a transverse axis, and means for turning said device about its longitudinal axis.

9. In a machine for closing or operating on open blanks, blank closing means, mechanism for carrying blanks forwardly to the closing means, said mechanism comprising a device which turns in a vertical plane about a transverse axis so as to carry a blank to a point adjacent the closing means, means for so turning the device in a vertical plane, means for shifting said device in an endwise direction so as to carry the blank into or out of the closing means, and means for turning said device on its longitudinal axis.

10. In a blank welding machine, welding means, mechanism for carrying blanks to the welding means, said mechanism comprising a device with blank gripping means, means for turning said device in a vertical plane about a transverse axis, means for giving said device endwise movement to carry the blanks into or out of the welding means, and means for turning said device on its longitudinal axis whereby the blanks may be turned so as to be struck by the welding means on both sides.

11. In a blank welding machine, welding means, mechanism for carrying the blanks to the welding means comprising a movable device having blank gripping means, means for turning said device in a vertical plane about a transverse axis so as to carry a blank to a point adjacent the welding means, means for giving said device endwise movements so as to carry the blank into and out of the welding means, and additional means for turning said device in a vertical plane about its transverse axis so as to raise or lower the blank relative to the welding means, said last named means being independent of the first named turning means.

12. In a blank welding machine, welding means, mechanism for carrying blanks to the welding means, said mechanism comprising a device having blank gripping means, means for turning said device in a vertical plane about a transverse axis so as to bring a blank to a point adjacent the welding means, means for giving said device endwise movements so that the blank may be carried into and out of the welding means, means for swinging said device in a vertical plane so as to raise or lower the blank with respect to the welding means, and means for turning said device on its longitudinal axis whereby the blank may be turned in the welding means.

13. In a blank welding machine, welding means, mechanism for carrying blanks to the welding means, said mechanism comprising a device having blank gripping jaws at each end, means for turning said device about a transverse axis through an arc of substantially 180° so as to carry a blank at a point adjacent the welding means, means for shifting said device in an endwise direction so that the blank may be carried into and out of the welding means, means for turning said device in a vertical plane so as to raise and lower the blank with respect to the welding means, and means for turning said device on its longitudinal axis so that the blank may be turned in the welding means.

14. In a machine for closing or operating on open blanks, blank closing means, mechanism for carrying blanks to the closing means, said mechanism comprising a device having blank gripping jaws at each end, means for turning said device about a transverse axis through an arc of substantially 180° so as to carry a blank to a point adjacent the closing means, means for shifting said device in an endwise direction so that the blank may be carried into and out of the closing means, and means for opening one pair of jaws and closing the other pair of jaws whereby the pair of jaws may release a finished blank and the other pair of jaws may grip an open blank.

15. In a machine for operating on open blanks, blank feeding mechanism, blank operating means, mechanism for carrying blanks from the feeding mechanism to the blank operating means, comprising a rotary device having blank gripping jaws at both ends, means for turning said device end for end about a transverse axis, and means for simultaneously closing one pair of jaws on a blank to be operated on, and for opening the other pair of jaws so as to release a blank already operated on.

16. In a machine for forming links, rings and the like from open blanks, a movable blank feeding device, blank operating means, mechanism for conveying blanks from the feeding device to the blank operating means, said device comprising a spindle having blank gripping jaws at both ends, said spindle being normally substantially horizontal with the forward pair of jaws closed on the blank being operated on and the rear pair of jaws open so as to be in position to receive a blank, mechanism for transferring a blank from the feeding mechanism to the open pair of jaws substantially at the termination of the action of the blank operating means on the blank carried by the other pair of jaws, means for simultaneously opening the closed pair of jaws so as to release the link formed from the blank last operated on, and closing the other pair of jaws so as to grip a blank, and means for turning the said device end for end.

17. In a blank welding machine, an intermittently moving blank feeding device, welding means, mechanism for conveying blanks from the feeding device to the welding means, said device comprising a spindle having blank gripping jaws at both ends, said spindle being normally substantially horizontal with the forward pair of jaws closed on the blank being operated on and the rear pair of jaws open, mechanism for transferring a blank from the feeding mechanism to the open pair of jaws substantially at the termination of the welding of the blank carried by the other pair of jaws, means for simultaneously opening the closed pair of jaws so as to release the link formed from the blank last operated on and for closing the other pair of jaws so as to grip a blank, means for turning said device end for end, means for giving said device endwise movements, and means for turning said device on its longitudinal axis.

18. In a blank welding and chain forming machine, welding means, mechanism for carrying a blank to the welding means comprising a movable device having blank gripping means, means for turning said device in a vertical plane about a transverse axis so as to carry a blank to a point adjacent the welding means, means for turning said device on its longitudinal axis so that the blank may be turned slightly and one end thereof may be caused to enter the last completed link, means for supporting the last completed link so that the end of the blank may enter the same, means for shifting said carrying device so that the blank is caused to enter into and later to pass from the welding means, means for shifting said device so that the blank is turned in the welding means during the welding operation, and means for causing the carrying means to release the blank after it has been operated on or welded and after it has been withdrawn from the welding means.

19. In a machine for closing or operating on open blanks, blank closing means, mechanism for conveying blanks to the closing means comprising a slidable member, a device rotatably supported by said slidable member and provided with blank gripping means, means for turning said device in a vertical plane so as to carry a blank to a point adjacent the closing means, and means for then operating said slidable member so as to carry the blank into and out of the closing means.

20. In a machine for operating on blanks, blank operating means, mechanism for carrying blanks to the blank operating means comprising a slide, a member carried by said slide and rotatable about a transverse axis and about its longitudinal axis, said member having blank gripping means, and devices for turning said member about a transverse axis and about its longitudinal axis, and for shifting said slide.

21. In a machine for operating on blanks, blank operating means, means for carrying a blank to the blank operating means, said carrying means comprising a device having blank gripping means, means for turning said member in a vertical plane about a transverse axis so as to carry the blank to a point adjacent the blank operating means, and independent means for turning said device in a vertical plane so as to raise and lower the blank with respect to the blank operating means.

22. In a machine for operating on blanks, blank operating means, mechanism for carrying blanks to the blank operating means comprising a member rotatable about a transverse axis and provided with blank gripping means, coöperating gear or toothed members for turning said blank carrying member intermittently so as to carry a blank to a point adjacent the blank operating means, additional gear or toothed members for turning said blank carrying member between the movements given to it by said first named gear members.

23. In a machine for operating on blanks, blank operating means, mechanism for carrying a blank to the blank operating means, said mechanism comprising a member movable about a transverse axis and provided at each end with blank gripping means, coöperating gears for turning said blank carrying member end for end so as to bring the blank to a point adjacent the blank operating means, additional means for turning said blank carrying member about its transverse axis, said last named turning means operating to turn the blank carrying member between the turning movements given it by the coöperating gears.

24. In a machine for operating on blanks, blank operating means, mechanism for carrying blanks to the blank operating means comprising a blank carrying member movable in a vertical plane about a transverse axis and having blank gripping means at each end, means comprising a pair of coöperating gears for intermittently turning said blank carrying member end for end, and additional gear members for turning the blank carrying member between the end for end movements.

25. In a machine for operating on blanks, blank operating means, mechanism for carrying a blank to the blank operating means, said mechanism comprising a member rotatable in a vertical plane about a transverse axis and provided with blank gripping means, means for turning said blank carrying means so as to carry a blank adjacent the blank operating means comprising two gears, one a continuously rotating driving gear, and the other engaged thereby and mechanically connected to said rotatable blank carrying member, and means for turning said blank carrying member through short arcs between the movements given it by said gears comprising an intermittently operating toothed member also mechanically connected to said blank carrying member.

26. In a machine for operating on blanks, blank operating means, mechanism for conveying blanks to the blank operating means, comprising a blank carrying member rotatable about a transverse axis and provided with blank gripping means, means for turning said blank carrying member so as to bring a blank to a point adjacent the blank operating means, said means comprising two coöperating gears one of which is a continuously moving segment gear adapted to intermittently engage the other gear, and additional means for turning said blank carrying member, said last named turning means comprising a cam operated rack which operates to turn said blank carrying member between the intermittent movements given to it by the said coöperating gears.

27. In a machine for operating on blanks, blank operating means, mechanism for conveying blanks to a point adjacent the blank operating means, said mechanism comprising a member rotatable about a transverse axis and provided with blank gripping means at each end, means for turning said blank carrying member end for end so as to bring a blank to a point adjacent the blank operating means, said turning means comprising a continuously moving gear, a gear adapted to coöperate therewith, a spindle carrying the said last named gear mechanically connected to said blank carrying member, and means for shifting said blank carrying member between the end for end movements comprising an additional gear or toothed member on the spindle, and a cam operated rack which coöperates therewith.

28. In a machine for operating on blanks, blank operating means, means for conveying blanks to a point adjacent the blank operating means comprising a member provided with blank gripping jaws at each end, means for turning said blank carrying member end for end about a transverse axis, additional means for turning the carrying member about the same axis between the end for end movements, and means for turning said blank carrying member about its longitudinal axis, said means comprising a longitudinally movable rack which coöperates with said blank carrying member, and means for intermittently operating said rack.

29. In a machine for operating on blanks, blank operating means, mechanism for conveying blanks to a point adjacent the blank operating means, said mechanism comprising a blank carrying member provided with blank gripping jaws at each end, means for turning said blank carrying member end for end about a transverse axis, means for turning said blank carrying member about the same axis between the end for end movements, means comprising a rack which coöperates with said blank carrying member for turning the latter about its longitudinal axis, a slide supporting said blank carrying member, and means for intermittently operating said slide so as to carry blanks into and out of the blank operating means.

30. In a machine for operating on blanks, blank feeding mechanism, blank operating means, mechanism for conveying blanks from the feeding mechanism to the blank operating means comprising a spindle having blank gripping jaws at each end, means for turning said spindle end for end so as to carry a blank to a point adjacent the blank operating means, said means comprising two coöperating gears, one being a continuously moving segment gear, means for turning said spindle about its longitudinal axis comprising a cam operated intermittently moving rack which coöperates with said spindle, means for raising and lowering the blank with reference to the blank operating means comprising a cam actuated intermittently moving rack, means for shifting the blank into and out of the blank operating means comprising a slide forming a support for said spindle and cam operated means for intermittently operating said slide, and means for opening and closing the jaws comprising intermittently acting cam operated devices which coöperate therewith.

31. In a chain forming machine, a feeding device adapted to be supplied with open blanks, blank closing means, jaws for supporting the finished link exterior to the blank closing means and adjacent the same, mechanism for carrying a blank from the feeding device forwardly so that it will be connected to said link, said carrying mechanism comprising a member which in carrying a blank forwardly is turned in a vertical plane about a transverse axis and is turned about its longitudinal axis, the blank being carried upwardly toward the link and skewed in a manner such that one of its ends enters into the link substantially at the termination of the turning movement about the transverse axis.

32. In a chain forming machine, feeding mechanism adapted to be supplied with open blanks, blank closing means, means for supporting a finished link at a point adjacent the blank closing means, said supporting means comprising an axially movable and rotary spindle having link gripping jaws, mechanism for carrying a blank forwardly and causing it to enter or to be connected to said link, means for turning said spindle so that the link may be turned to facilitate the entrance of the blank into the same, said turning means comprising an intermittently operated rack which coöperates with said spindle, and means for moving the spindle in an endwise direction after the blank has been connected thereto, said last named means comprising an arm in coöperative relation with said spindle, and a cam for shifting the arm.

33. In a machine for forming chain from open blanks, blank closing means, means for supporting a finished link at a point adjacent the blank closing means, means for carrying blanks to the blank closing means, comprising a member having blank gripping means, mechanism for operating said member so that the blank gripping means are swung upwardly toward the link and are also turned about the longitudinal axis of said member so that one end of a blank enters into the link at substantially the termination of the swinging movement, means for turning the link supporting means so that the link may be in position for one end of the blank to enter the same, means for withdrawing the link holding means from the link after the blank has been attached to said link, and means for moving the blank into the blank closing means.

34. In a chain forming machine, mechanism for feeding open blanks, blank closing means, means for supporting a finished link at a point adjacent the blank closing means, means for carrying blanks from the feeding mechanism to the blank closing means comprising a member having blank gripping means, means for rotating said member in a vertical plane about a transverse axis so that the blank is carried upwardly toward the link and one end of the blank enters into the link at substantially the termination of the rotary movement, means for turning the link supporting means so that the link may be in position for one end of the blank to enter the same, means for withdrawing the link holding means from the link after the blank has been attached to the latter, and means for shifting said carrying member so as to move the blank into the blank closing means.

35. In a machine for forming chain from open blanks, blank closing means, means for supporting a finished link at a point adjacent the blank closing means, means for carrying blanks to the blank closing means, said carrying means comprising a member having blank gripping means, said member being rotatable in a vertical plane about a transverse axis and being movable about its longitudinal axis so that the blank is swung upwardly toward the link and one end of the blank is caused to enter into the link at substantially the termination of the rotary movement, means for moving the link supporting means so that the link may be in position for one end of the blank to enter the latter, means for withdrawing the link holding means from the link after the blank has been attached to said link, and mechanism for moving said blank carrying member so that the blank passes into and later out of the blank closing means.

36. In a chain forming machine, welding means, means for supporting a finished link at a point adjacent the welding means, means for carrying blanks to the welding means comprising a member having blank gripping means, said member being rotatable in a vertical plane about a transverse axis, and being movable about its longitudinal axis so that a blank is moved forwardly and upwardly toward the link and is skewed so that one end of the blank enters into the link at substantially the termination of the rotary movement, means for moving the link supporting means so that the link may be in position for one end of the blank to enter the same, means for withdrawing the link holding means from the link after the blank has been attached to said link, and mechanism for shifting said blank carrying member so that the blank passes into the welding means, is then lowered into position to be welded, and is turned so that the blank may be struck on both sides.

37. In a chain forming machine, welding means, means for supporting a finished link at a point adjacent the welding means, means for carrying blanks to the welding means, said carrying means comprising a member having blank gripping jaws, means for rotating said member in a vertical plane about a transverse axis, so that the jaws are swung upwardly toward the link and means for turning said member about its longitudinal axis so that one end of the blank carried by said jaws may enter into the link at substantially the termination of the rotary movement, means for moving the link supporting means so that the link may be in position for one end of the blank to enter the same, means for withdrawing the link holding means from the link after the blank has been attached to said link, and mechanism for shifting said blank carrying member so that the blank passes into the welding means, is lowered into position to be welded, is turned so that the blank may be struck on both sides, and is then raised with reference to the welding means and withdrawn therefrom.

38. In a chain forming machine, welding means, means for supporting a finished link at a point adjacent the welding means, means for carrying blanks to the welding means comprising a member having blank gripping jaws, means for turning said member in a vertical plane about a transverse axis so that the jaws are swung upwardly toward the link, and means for turning said member about its longitudinal axis so that one end of the blank carried by said jaws may enter into the link, means for moving the link supporting means so that the link may be in position for one end of the blank to enter the same, means for withdrawing the link supporting means from the link after the blank has been attached to the latter, mechanism for shifting said blank carrying member so that the blank passes into the welding means, is then lowered into position to be welded, is turned so that the blank may be struck on both sides, is raised with reference to the welding means and withdrawn therefrom, and means whereby the link supporting means is moved forwardly and is caused to engage the welded blank, and means whereby the jaws on the blank carrying member are caused to release the welded blank.

39. In a chain forming machine, welding means, means for supporting a finished link at a point adjacent the welding means, means for carrying open blanks to the welding means comprising a member having blank gripping jaws, means for turning said member in a vertical plane about a transverse axis so that the jaws are swung upwardly toward the link, means for turning said member about its longitudinal axis so that one end of the blank carried by said jaws enters into the link, means for moving the link supporting means so that the link may be in position for one end of the blank to enter the same, means for withdrawing the link holding means from the link after the blank has been attached to said link, mechanism for shifting said blank carrying member so that the blank passes into the welding means, is lowered into position to be welded, is turned so that the blank may be struck on both sides, is raised with reference to the welding means and withdrawn therefrom, and is lowered with respect to the welding means to a position such that the link supporting means may be moved forwardly to grip and support the welded blank, and means for causing the disengagement of the blank holding jaws from the welded blank after it has been gripped by the link supporting means.

40. In a chain making machine, blank feeding mechanism, blank closing means, a device for carrying blanks from the feeding mechanism to the closing means, said device being provided with blank gripping means, means for swinging said device in a vertical plane about a transverse axis through an arc of substantially 180 degrees downwardly from the feeding mechanism and upwardly toward the blank closing means, and means for giving said device an additional movement prior to the termination of said upward swinging movement so as to cause the interlinking of the blank with the last completed link.

41. In a machine for operating on blanks, blank operating means, mechanism for carrying blanks toward the blank operating means, said mechanism comprising a device supported between its ends for movement about a transverse axis, blank gripping means at both ends of said device, and means for turning said device, end for end, about said axis.

42. In a machine for operating on blanks, blank operating means, mechanism for carrying blanks toward the blank operating means comprising a device supported between its ends for movement about a transverse axis, blank gripping means at both ends of said device, means for turning said device intermittently in the same direction, each movement being through an arc of substantially 180°.

43. In a blank operating machine, blank operating means, means for carrying blanks toward the operating means, comprising a device supported between its ends for movement about a transverse axis, blank gripping means at both ends of said device, means for intermittently turning said device end for end, and means for closing the blank gripping means at one end of said device, and for opening the blank gripping means at the opposite end thereof.

In testimony whereof, I hereunto affix my signature in the presence of two witnesses.

EDWARD LINDMUELLER.

Witnesses:
H. R. SULLIVAN,
A. F. KWIS.